(12) United States Patent
Adachi et al.

(10) Patent No.: US 6,547,659 B1
(45) Date of Patent: Apr. 15, 2003

(54) POULTRY PROCESSING METHOD AND SYSTEM

(75) Inventors: Takashi Adachi, Tokyo (JP); Shiro Kumazawa, Tokyo (JP); Kiyoshi Higuchi, Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/856,355
(22) PCT Filed: Sep. 22, 1999
(86) PCT No.: PCT/JP99/05194
  § 371 (c)(1),
  (2), (4) Date: Sep. 5, 2001
(87) PCT Pub. No.: WO01/21002
  PCT Pub. Date: Mar. 29, 2001

(51) Int. Cl.$^7$ ................................................. A22B 7/00
(52) U.S. Cl. ........................................ 452/173; 452/74
(58) Field of Search ........................... 452/52, 53, 71, 452/74, 75, 77, 135, 149, 158, 173, 174, 183, 184, 67, 106

(56) References Cited

U.S. PATENT DOCUMENTS

| | | | |
|---|---|---|---|
| 3,522,058 A | * | 7/1970 | Libby |
| 3,729,773 A |   | 5/1973 | Dillon |
| 3,886,762 A | * | 6/1975 | Rothstein et al. |
| 4,667,370 A | * | 5/1987 | Brockington et al. |
| 4,965,911 A | * | 10/1990 | Davey |
| 5,263,891 A | * | 11/1993 | Weiner et al. |
| 5,306,205 A | * | 4/1994 | Gilles |
| 5,980,375 A | * | 11/1999 | Anderson et al. |
| 5,980,377 A | * | 11/1999 | Zwanikken et al. |

FOREIGN PATENT DOCUMENTS

| | | | |
|---|---|---|---|
| EP | 0406980 | * | 1/1991 |
| GB | 2264217 |   | 8/1993 |
| GB | 2280093 |   | 1/1995 |

OTHER PUBLICATIONS

Supplementary European Search Report, Oct. 17, 2002.

* cited by examiner

Primary Examiner—Charles T. Jordan
Assistant Examiner—David Parsley
(74) Attorney, Agent, or Firm—Crowell & Moring LLP

(57) ABSTRACT

A poultry treatment system relating to dissection, shape arrangement, and dispensing treatment, which can prevent the growth of bacteria in cleaning, cooling, and succeeding treatment processes for making possible the securing of the least contaminated state (the number of common live bacteria carried by a packed article of 2 kg is $10^2$), composed of; a pretreatment section 20 comprising hanging part 20a, bloodletting part 20b, immersion-in-hot-water part 20c; a treatment section 10 comprising a plucking part 11, hollowing part 12, cleaning/sterilizing/cooling part 13, and water-washing part 14; a dissecting/dispensing/packaging section comprising a automatic dissection part 16, shape arrangement part 17, dispensing/packaging part 18; and shipment section 21.

7 Claims, 6 Drawing Sheets

PRIOR ART FIG. 5

POULTRY PROCESSING METHOD AND SYSTEM

FIELD OF THE INVENTION

The present invention relates to the treatment of slaughtered poultry, specifically to a method of treating poultry and the system thereof for preventing bacterial contamination.

TECHNICAL BACKGROUND

Conventionally, the treatment of poultry is performed based on the poultry treatment system shown in FIG. 5.

The poultry treatment system of prior art is, as shown in the figure, composed of; a pretreatment section 50 comprising a hanging part 50a, a bloodletting part 50b, and an immersion-in-hot-water part 50c; a treatment section 51 comprising a plucking part 51a where the pretreated poultry is plucked, a hollowing part 51b where the plucked poultry is cleared of the internal organs, the back passage, the trachea, and the gullet, except for the kidney, and a cleaning/sterilizing/cooling part 51c where the plucked and cleared-of-internal-organs poultry (hereafter referred to as hollowed poultry) is cleaned and sterilized; a dissecting/dispensing/packaging section 52 comprising a deboning/dissecting part 52a where the constituent parts of the hollowed poultry are disjointed and de-boned by manual work, a shape arrangement part 52b where each constituent part is arranged of its shape manually, and a dispensing/packaging part 52c (pack of 2 kg); and a shipment section 53 where freezing and packaging for shipment are performed.

In the cleaning/sterilizing/cooling part 51c, generally two or more water tanks are used. A water tank 51e of upstream operation side into which the hollowed poultry is firstly immersed is for cleaning. A water tank 51f of downstream operation side is for cooling the hollowed poultry. Clean water doped with bactericide is supplied from a bactericide-added liquid supply tank 51k to the water tank 51f of downstream operation side. The water with bactericide overflows the water tank 51f to the water tank 51e. The contaminated water overflowing the water tank 51e is drained out as effluent or it is circulated passing through a filter 51h to the bactericide added liquid supply tank 51k.

Each water tank is kept to low temperature by receiving cold heat 51g through the medium of a heat exchanger for cooling.

Thus, the hollowed poultry from the hollowing part 51b is cleaned, sterilized, and cooled in the cold water tanks supplied with the bactericide-added liquid from the bactericide-added liquid supply tank 51k.

FIG. 6 is a diagrammatic illustration showing the manual operations at the de-boning/dissecting part 52a and the shape arrangement part 52b after the cleaning/sterilizing/cooling part 51c. The manual operations at the de-boning/dissecting part 52a where the constituent parts of the poultry are disjointed and de-boned, at the shape arrangement part 52b where peeling-off of the skin, etc. are performed, and at the dispensing/packaging part 52c, are performed under an atmosphere of ordinary temperatures of 18~20° C. Furthermore, the hollowed poultry is liable to stagnate at the entrance to the dissection/dispensing/packaging section 52. So secondary contamination through worker's hands, etc., bacterial contamination through mutual contamination, and the growth of bacteria, are induced, which has been a problem in sanitation control.

It is necessary for sanitation control of the food treatment process performed in the poultry treatment system that bacteria adhered to the surface are cleared or killed before the first dissection to keep the surface in the least contaminated state with bacteria and the contamination and infection with bacteria in the succeeding dissection process is prevented.

In the case of poultry treatment, the poultry must be reduced to the least contaminated state with bacteria in the process of cleaning, sterilizing, and cooling; and the operations in the succeeding dissection, shape arrangement, and dispensing/packaging processes must be performed in an environment sufficient to prevent contamination and the growth of bacteria. Sufficient consideration must be given to the conventional processes and system in regard to the condition of sterilization of bacteria in the cleaning, sterilizing, and cooling processes; to the maintenance of the least contaminated state secured theretofore; and to the operations and temperatures of atmosphere in succeeding processes.

Regarding the contamination with bacteria, the indicator is the number of bacteria per 1 g of food article. It is said for a chicken, for example, that the quality maintenance period is 4 weeks if the number of live bacteria is $10^2$ per 1 g of the meat.

Regarding the temperature of atmosphere, 6° C. is said to be the lower limit for the growth of bacteria. So, generally, the temperature should be kept below or equal to 6° C.

For the prevention of contamination and drying in the succeeding processes, immediate packaging after dissection is needed. Stepped up consideration and improvements are desired concerning the long staying period under ordinary atmosphere temperature before packaging and the manual operations, from the viewpoint of prevention of contamination.

SUMMARY OF THE INVENTION

The present invention is made in the light of the problems mentioned above. The object is to provide a poultry treating method and the system thereof, in which are performed; a cleaning and cooling capable of securing sufficient low level of the least contaminated state with bacteria for maintaining quality (the number of common live bacteria in the packed meat is about $10^2$ per 1 g) and a dissection, shape arrangement; and dispensing capable of preventing the contamination with and growth of bacteria in the succeeding processes.

The present invention is characterized in that the poultry treating method comprises; a pretreatment process comprising a hanging step, a bloodletting step, and a immersion-in-hot-water step; a succeeding treatment process comprising a plucking step, a hollowing step, and a cleaning/sterilizing/cooling step in which cleaning, sterilizing, and chilling (ice temperature) are performed; a succeeding dissecting/dispensing/packaging process comprising an automatic dissection step in which disjointing of the hollowed poultry to large parts and de-boning of the disjointed breast, thighs, etc. are performed automatically in a refrigerator, a shape arranging step in which operations after the dissection is performed manually in the open space above a conveyor (the open space is prepared so that the manual operation is possible), and a dispensing/packaging step in which the shape-arranged poultry parts are dispensed and packaged; and a succeeding shipping process in which freezing, packaging and shipping are performed right after the preceding step; and the dissecting/dispensing/packaging process needed to be performed after the treatment process before the freezing/shipping process are performed in a low temperature zone of at least below or equal to 6° C.

In the method described above, the number of bacteria are minimized at the cleaning/sterilizing/cooling step where the hollowed poultry is cleared of the bacteria and the like attached thereto and then sterilized by a bactericide diluted with clean water and cooled. So it will do if the growth of minimized bacteria is suppressed in the succeeding processes.

Further, the dissection of the hollowed poultry into large parts and de-boning of the disjointed breast and thighs are carried out automatically in the refrigerator, while the manual operation is limited to the shape arranging step and dispensing step. So, contamination from outside, that is secondary contamination and cross contamination, can be suppressed.

The treatment process after the cleaning/sterilizing/cooling step before the shipping step is done under the low temperature atmosphere of 6° C. or below with which temperature the growth of bacteria is suppressed, and the packaging is accomplished in a condition with which the growth of bacteria is suppressed. So, the treated meat can secure the freshness close to that right after the completion of the cleaning/sterilizing/cooling step.

It is suitable to carry out the dispensing/packaging while the meat treated under environment temperatures of 0~6° C. in the preceding step is transferred to the packaging step.

According to the invention of claim 2, as also the dispensing of the shape-arranged meat is performed while it is transferred in a low temperature atmosphere of 0~6° C., dispensing and packaging are possible without stagnation, and contamination prevention through fast treatment is effected.

Further, it is preferable to interpose cleaning with water before the cleaning/sterilizing/cooling step, after the plucking step, and after the hollowing step.

By performing cleaning for washing off the bacteria adhered to the plucked poultry three times, that is, after the plucking step, after the hollowing step, and before the cleaning/sterilizing/cooling step, the density of sodium hypochlorite for sterilization can be decreased to 10~30 ppm compared with 200 ppm in the case without the washing with water. As a result, since the density of diluted bactericide can be reduced to 30 ppm, stimulus odor when the meat packet is unwrapped can be suppressed to low level.

The present invention can be offered as a poultry treating system. Such system is a poultry treatment system composed of; a pretreatment section where the poultry is hung, bled, and immersed in hot water; a treatment section comprising a plucking part for plucking feathers from the immersed poultry, a hollowing part for removing the internal organs and the like, and a cleaning/sterilizing/cooling part for cleaning, sterilizing, and cooling the hollowed poultry; a dissecting/dispensing/packaging section comprising an automatic dissection part for dissecting the hollowed poultry, a shape arranging part for arranging manually the meat shape, and a dispensing/packaging part for dispensing and packaging the meat to shape for distribution; and a shipment section for freezing, packaging and shipping the meat formed for distribution; characterized in that, water-washing parts are provided in the treatment section for performing washing after the plucking and hollowing and before the cleaning/sterilizing/cooling treatment, dissecting in large parts and de-boning of the disjointed breast and thighs are automatically performed in the automatic dissection part in an atmosphere of temperatures below or equal to 6° C., the shape arranging part is composed so that manual operations are possible on a cooled transfer conveyor from the dissection part under an atmosphere temperature below or equal to 6° C., and the dispensing/packaging part is composed so that packaging is possible without stagnation on a conveyor in an atmosphere of temperatures below or equal to 6° C.

DETAILED DESCRIPTION OF THE PREFFERRED EMBODIMENTS

A preferred embodiment of the present invention will now be detailed with reference to the accompanying drawings. It is intended, however, that unless particularly specified, dimensions, materials, relative positions and so forth of the constituent parts described in the embodiments shall be interpreted as illustrative only not as limitative of the scope of the present invention.

Figure 1:
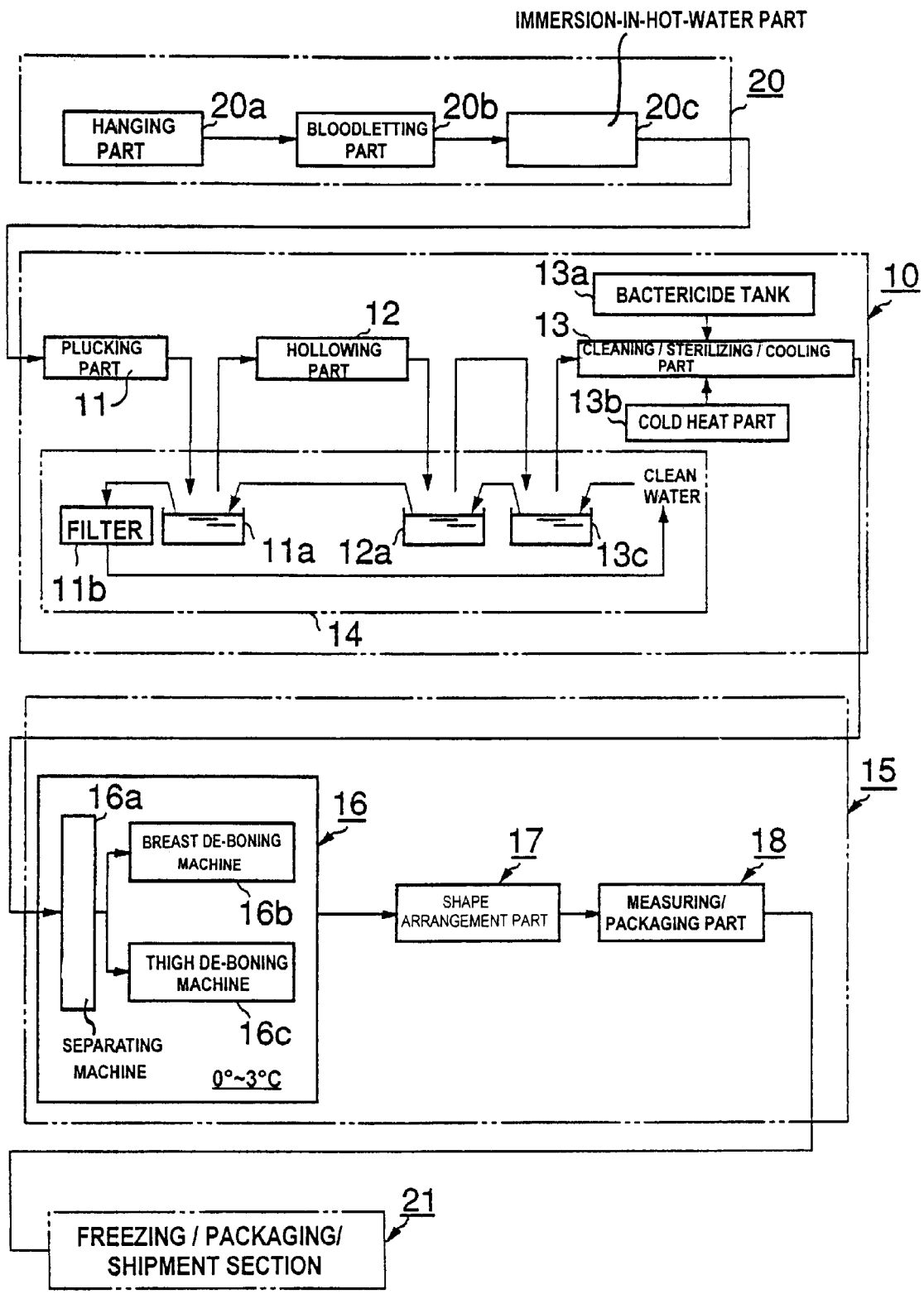
FIG. 1 is a flow diagram showing a schematic illustration of the configuration of a poultry treating system according to the present invention.
Figure 2:
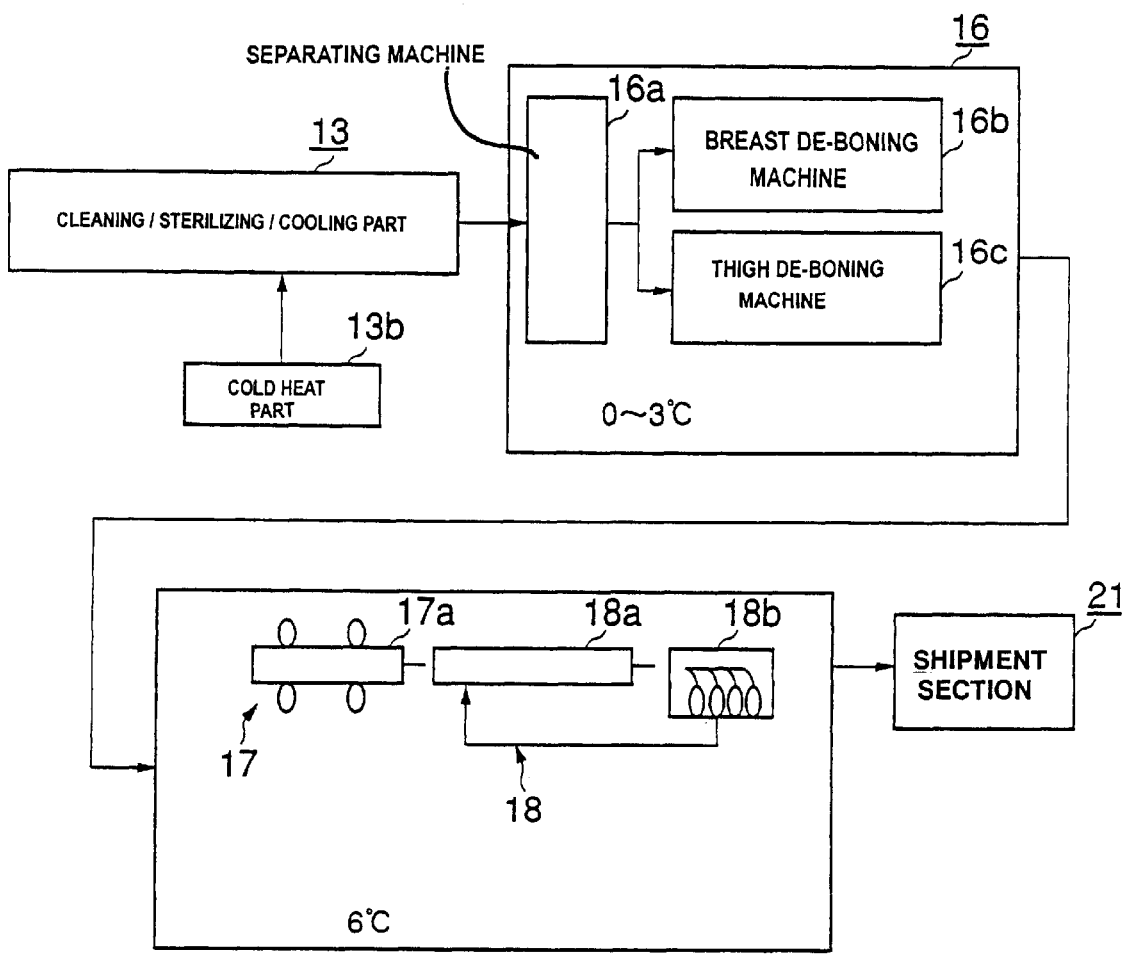
FIG. 2 is a schematic illustration showing the situation of automation for preventing bacterial contamination and the situation of low environment temperature of the treatment section of FIG. 1 after cleaning/sterilizing/cooling part.

FIG. 1 is a flow diagram showing a schematic illustration of the configuration of a poultry treatment system according to the present invention. FIG. 2 is a schematic illustration showing the situation of the automation for preventing bacterial contamination and the situation of low environment temperature of the treatment section of FIG. 1 after cleaning/sterilizing/cooling part.

Figure 3:
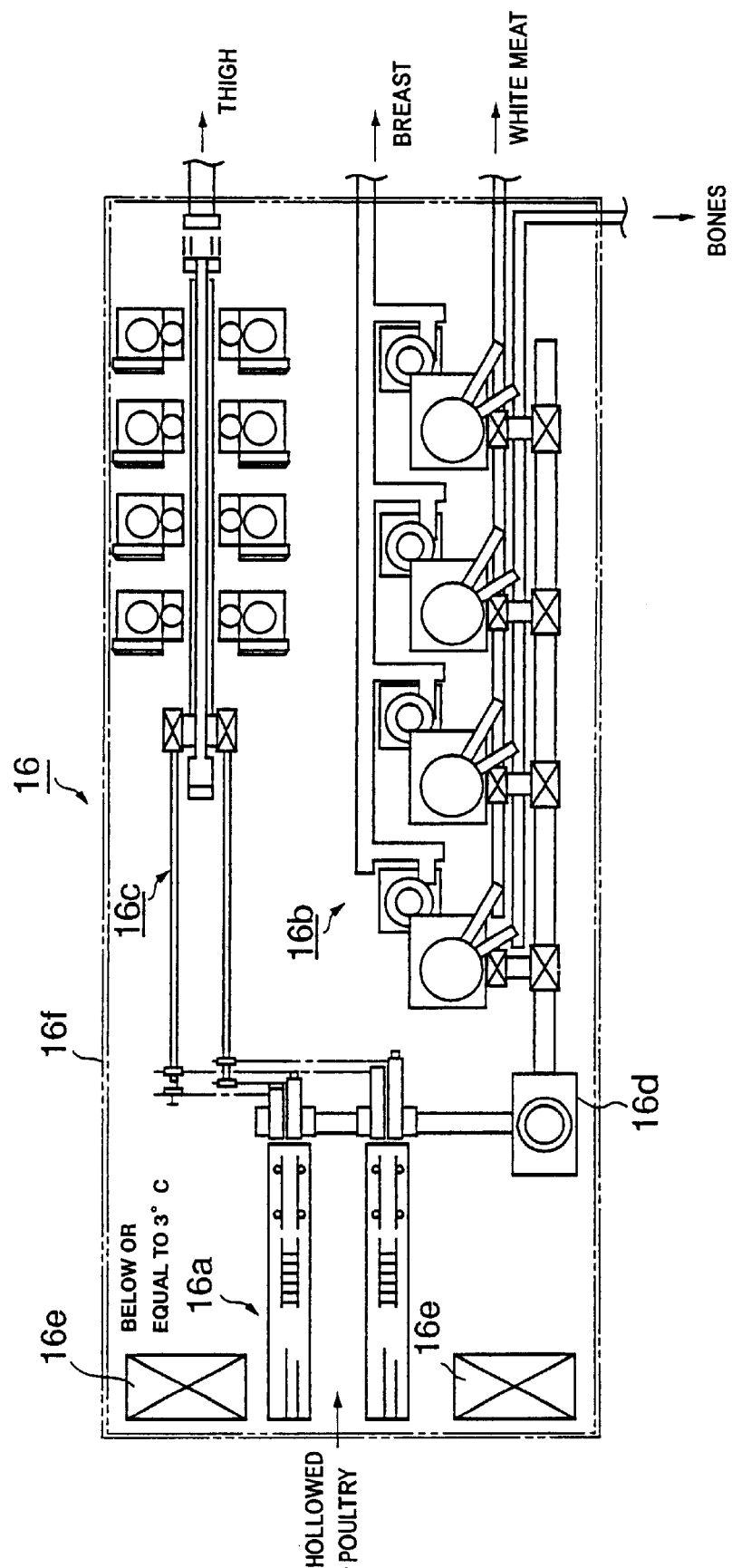
FIG. 3 is an illustration showing the low temperature treatment system of the automatic dissection part 16 of FIG. 2.
Figure 4:
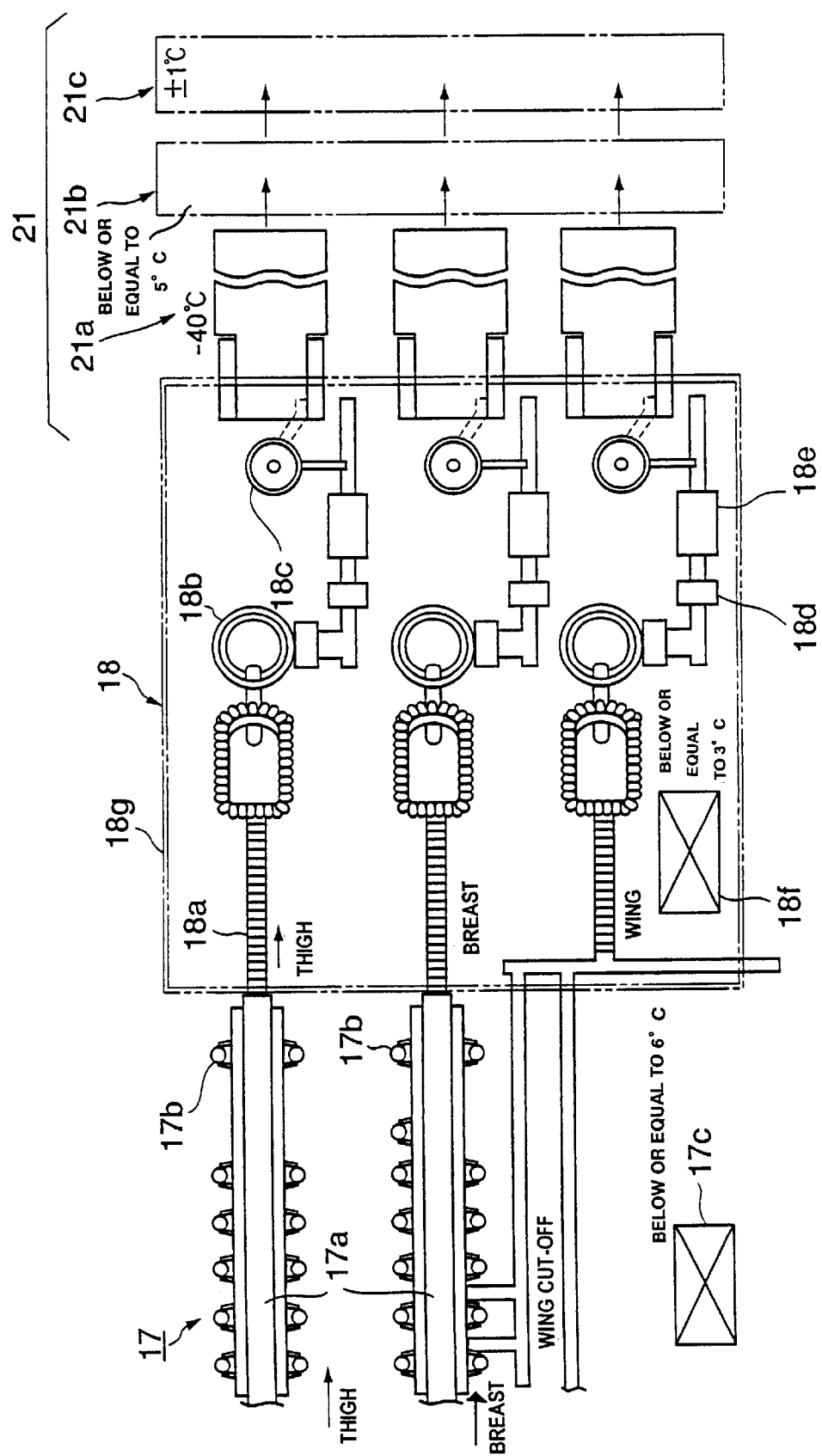
FIG. 4 is an illustration showing the low temperature treatment system of the shape arranging part 17, dispensing/packaging part 18, and shipment section 21 of FIG. 2.
Figure 5:
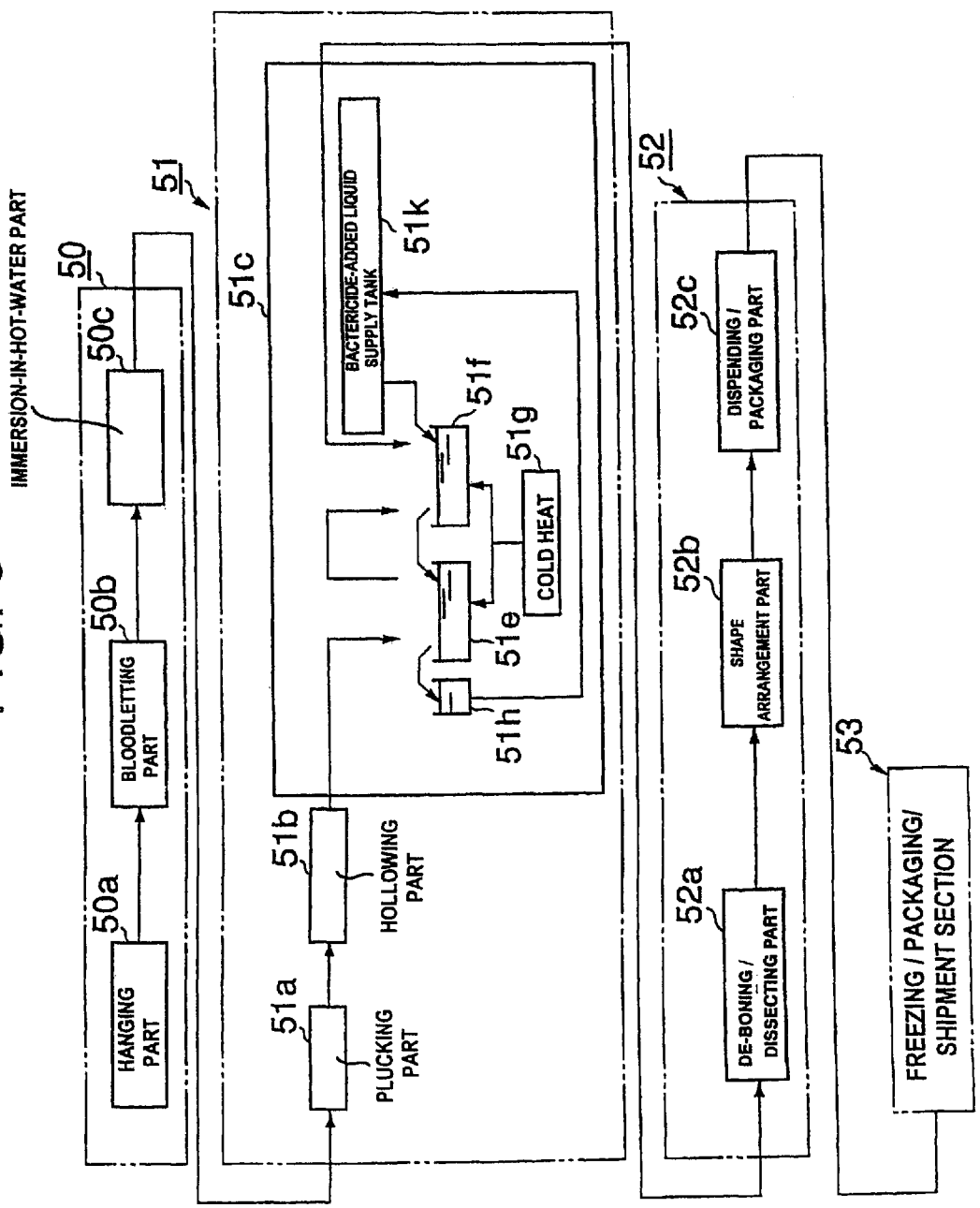
FIG. 5 is a flow diagram showing a schematic illustration of the configuration of a poultry treatment system of prior art.
Figure 6:
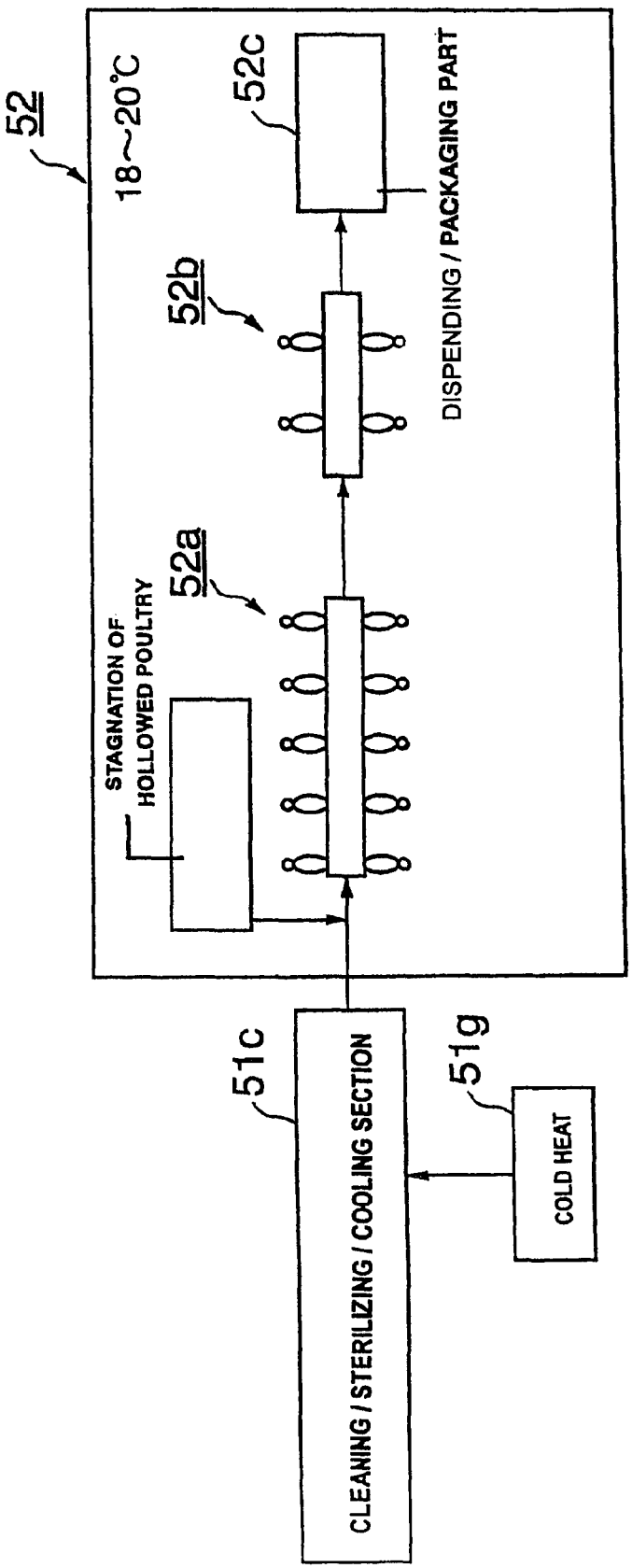
FIG. 6 is a schematic illustration showing the situation of manual treatment for prevention of bacterial contamination and the situation of low environment temperature of the treatment section of FIG. 5 after cleaning/sterilizing/cooling part.

FIG. 3 and FIG. 4 are illustrations showing the low temperature treatment system from the automatic dissection part until before the shipment section of FIG. 2.

As shown in FIG. 1, a poultry treatment system according to the present invention is composed of a pretreatment section 20 comprising a poultry hanging part 20a, a blood-letting part 20b, and an immersion-in-hot-water part 20c; a treatment section 10; a dissecting/dispensing/packaging section 15; and a shipment section 21 where freezing, packaging, and shipping are carried out.

The treatment section 10 is composed of a plucking part 11 where the immersed poultry in the pretreatment section 20 is plucked of the feathers; a hollowing part 12 where the plucked poultry is cleared of the internal organs, back passage, trachea, and gullet, except for the kidney; a cleaning/sterilizing/cooling part 13 where the hollowed poultry is cleaned, sterilized, and cooled to ice temperature; and a water-washing part 14.

The water-washing part 14 comprises the first washing tank 11a provided after the plucking part 11, the second washing tank 12a provided after the hollowing part 12, and the third washing tank 13c provided before the cleaning/sterilizing/cooling part 13. For washing off the bacteria adhered to the plucked poultry, clean water (running water) is supplied to the washing tank 13c. The water overflows to the second washing tank 12a and to the first washing tank 11a in succession. The overflowed water from the washing tank 11a is partly passed through a filter 11b provided in front of the washing tank 11a to be returned to the washing tank 13c.

By this configuration, the plucked poultry is cleaned in the first washing tank 11a, then the hollowed poultry is washed in the second one 12a, and lastly in the third one 13c. The hollowed poultry is transferred from the third washing tank 13c into a cooling tank which constitute the cleaning/sterilizing/cooling part 13. A bactericide, for example, sodium hypochlorite diluted with clean water is supplied to the cooling tank from a bactericide tank 13a which is cooled to ice temperature by the medium of a cold heat part 13b, to sterilize the plucked poultry. The cleaned and sterilized hollowed poultry is supplied to the dissecting/dispensing/packaging section 15. According to the configuration, the density of water solution of sodium hypochlorite can be decreased to 50 ppm when the washing with water is done only in the first washing tank 11a, to 30~40 ppm when the washing with water is done after plucking and after hollowing, and to 20~30 when the washing with water is done three times, i.e. after plucking, after hollowing, and before cleaning/sterilizing/cooling treatment, compared with $10^2$ ppm which is needed when the washing with water is not done as in prior art. Thus, by the washing through the water-washing part 14, the number of common live bacteria is reduced, and at the same time the density of bactericide agent can be lowered. As a result, stimulus odor exhaled when the meat packet is unwrapped is alleviated.

The dissecting/dispensing/packaging section 15 is composed of an automatic dissection part 16 where the poultry treated in the treatment section 10 is dissected, a shape arrangement part 17 where shape arrangement is carried out manually, and a dispensing/packaging part 18 where the meat is shaped for distribution.

The automatic dissection part 16 is so composed that a separating machine 16a which disjoints the hollowed poultry in large parts, a breast de-boning machine 16b which de-bones the disjointed breast, and a thigh de-boning machine which de-bones the disjointed thighs, operate in a refrigerator of temperature of 0~6° C., preferably 0~3° C. Thus the dissection is performed automatically without manual work in an atmosphere in which the growth of bacteria is impossible. At the shape arrangement part 17, as shown in FIG. 2, peeling-off of the skin of the automatically treated meat and shape arrangement thereof are carried out manually on a cooled transfer conveyor 17a orderly without stagnation. At the succeeding dispensing/packaging part 18, weight of meat is measured in each bucket of a bucket transfer conveyor 18a. In the embodiment, 2 kg of meat combination is put in the bucket and transferred to a packaging machine 18b. The bucket with dispensed meat short of 2 kg is returned to the start of the bucket conveyor 18a to be again dispensed with meat. Thus, continuous dispensing and packaging operation is possible.

The shape arrangement and dispensing/packaging is performed in an atmosphere of temperatures below or equal to 6° C., preferably below or equal to 3° C., to prevent the growth of bacteria and at the same time stagnation is prevented as mentioned above. For manual operation of peeling-off the skin and shape-arrangement, the cooled conveyor with open space thereabove for enabling manual work is used. Thus, the treated meat is maintained at low temperature and condensation on the meat by contact with ordinary temperature owing to stagnation is completely excluded.

In FIG. 3 and FIG. 4 is shown an illustration of the low temperature treatment system from the automatic dissection part until before the shipment section of FIG. 2. FIG. 3 shows the low temperature treatment system of the automatic dissection part 16, and FIG. 4 shows the low temperature treatment system of the shape arrangement part 17, dispensing/packaging part 18, and shipment section 21.

As shown in FIG. 3, the automatic dissection part 16 of the embodiment comprises the separating machine 16a, breast de-boning machine 16b, thigh de-boning machine 16c, and transfer device 16b which transfers the breast and right and left thighs disjointed by the separating machine 16a to the breast de-boning machine 16b and thigh de-boning machine 16c. The machines and device are arranged in a closed space 16f (for example, in a freezing room). The atmosphere temperature of the closed space 16f is maintained to below or equal to 3° C. The hollowed poultry entered from the left side (in the drawing) of the closed space 16f is disjointed automatically without manual work in low temperature and the thighs, breast, and white meat are transferred to the next step on cooled conveyors from the right side (in the drawing) of the closed space 16f.

As shown in FIG. 4, shape arrangement part 17 is lines, where the peeling-off of the skin of the thighs and breast transferred in cold state from the automatic dissection part 16 on the conveyor 17a, are carried out manually without stagnation. The thighs are inspected at an inspection part 17b, transferred to the next dispensing/packaging part 18. Wings are cut off the breast in the breast line, inspected in an inspection part 17b, transferred to the next dispensing/packaging part 18.

As the shape arrangement is manual operation on the cooled conveyor 17a, an atmosphere temperature below or equal to 6° C. is maintained in the room.

The succeeding dispensing/packaging part 18 composed of lines each of which is provided with a bucket transfer conveyor 18a, vacuum packing machine 18b, metal detector 18d, tare checker 18e, and aligning robot 18c, arranged in a closed space 18g of which temperature below or equal to 3° C. is maintained, and all of the operations are performed automatically.

Vacuum packed articles are quick-chilled on a, for example, steel belt freezer 21 for chilling article to an article temperature of about 0° C. or lower, then packaged under an atmosphere of 5° C. or lower, and stored in a storage part 21c at temperatures of ±1° C.

EFFECTS OF THE INVENTION

According to the present invention, manufacture of food articles of 2 kg pack carrying $10^2$ of common live bacteria is possible through maximum three times washing before cleaning/sterilizing/cooling treatment of a plucked and hollowed poultry, automated dissection and de-boning, manual operation of shape arrangement and dispensing/packaging thereof, in atmosphere temperatures of 0~6° C. of the dissecting/dispensing/packaging section, and realization of quality maintenance period of 4 weeks is possible.

What is claimed is:

1. A poultry processing system, comprising:
    a pretreatment process section which comprises
        a hanging part, an exsanguination part, and
a hot water immersion part;
a carcass treatment process section which comprises
a defeathering part,
an eviceration part,
a rinsing part for rinsing the deplumed carcass before and after eviceration, and
a rinsing/sterilizing/cooling part;
an automatic dissecting process section in which the carcass is butchered into the breast and thighs and the breast and thighs are deboned;
a shape arranging process section for arranging the shape of the poultry meat; and
a dispensing/packing process section for weighing and packing the poultry meat,
wherein said rinsing part of said carcass treatment process section comprises a first washing tank used between the defeathering part and the eviceration part, a second washing tank used after the evisceration part, and a third washing tank used between the second washing tank and the rinsing/sterilizing/cooling part,
the first washing tank, second washing tank, and third washing tank removing bacteria adhered to the carcass,
clean water being supplied to the third washing tank, water in the third washing tank being overflowed to the second washing tank, water in the second washing tank being overflowed to the first washing tank, and some water overflowed from the first washing tank being filtered then returned to the third washing tank,
the rinsing/sterilizing/cooling part of the carcass treatment process section comprising a cooling tank containing chilled water and a sterilizing agent for disinfecting and cooling the carcass to a chilled state, and
the automatic dissecting process, the shape arranging process and the dispensing/packing process being performed at a temperature of approximately 0–6° C.

2. A poultry processing system according to claim 1, wherein said automatic dissecting process section comprises:

a dissector;
a breast deboner, and;
a thigh deboner,
wherein the dissector, the breast deboner, and the thigh deboner being operated at a temperature of approximately 0–6° C. in an atmosphere impossible for bacteria to grow, and
the dissector, the breast deboner, and the thigh deboner all being automatic machines.

3. A poultry processing system according to claim 1,
wherein said shape arranging process section being provided with a low temperature conveyor, and
an open space being provided above the shape arranging process section to allow manual performance of the arranging.

4. A poultry processing system according to claim 1, wherein the dispensing/packing process section is an enclosed space maintained at or below 6° C. where automatic dispensing and packing are possible.

5. A poultry processing system according to claim 4, wherein the dispensing/packing process section is maintained at or below 3° C.

6. A poultry processing system according to claim 1,
wherein the automatic dissecting process section is refrigerated to temperatures of approximately 0–6° C. and is capable of dissecting and deboning automatically,
the shape arranging process section is provided with a low temperature conveyor,
an open space is provided above the shape arranging process section low temperature conveyor to allow manual performance of the arranging, and
the dispensing/packaging process section is performed in an enclosed space at temperatures at or below 6° C.

7. A poultry processing system according to claim 6, wherein said dispensing/packaging process section is maintained at temperatures at or below 3° C.

* * * * *